UNITED STATES PATENT OFFICE.

FREDERICK LAMBE, OF LONDON, ENGLAND.

IMPROVEMENT IN TREATING SOLID AND LIQUID HYDROCARBONS.

Specification forming part of Letters Patent No. 115,871, dated June 13, 1871.

*To all whom it may concern:*

Be it known that I, FREDERICK LAMBE, of London, England, have invented a new and useful Improved Method of Treating Paraffine and Fatty Oils; and I do hereby delare that the following is a full, clear, and exact description thereof, which will enable others skilled in the art to make and use the same.

My invention relates to a new and improved process of treating paraffine and fatty oils in order to remove the coloring matter and other impurities therefrom.

I first melt the fatty oil or crude paraffine, and, having allowed the mechanical impurities which it contains to subside, I run the liquid clarified oil or paraffine into another vessel, where I again heat it to about 250° Fahrenheit, and then add to it about ten per cent. by weight of sulphuric acid of the strength of oil of vitriol of commerce, with which I agitate it, so as to form a complete mixture between the acid and the melted oil or paraffine. I then allow the tarry or colored matter formed by the action of the acid to deposit, and after this has taken place I draw off the supernatant liquid oil or paraffine from the sediment. To the oil or paraffine thus treated I add a quantity of fuller's-earth, in fine powder, the heat of the oil or paraffine, being maintained at about 230° of Fahrenheit; and after thoroughly mixing this with the oil or paraffine I allow the whole to settle. After this the clear oil or paraffine may be drawn off and mixed with spirit or coal naphtha, and then pressed and filtered through animal charcoal in the ordinary manner.

The treatment with fuller's-earth may be repeated one or more times, if thought necessary, so as to effect the more complete purification of the oil or paraffine.

The fuller's-earth might be used for finishing the bleaching of paraffine in lieu of animal charcoal, whatever the previous process of purification may have been. In that case about twelve per cent. of powdered fuller's earth is added to the melted paraffine, which is maintained at a temperature of about 230° Fahrenheit, and well agitated, and after subsidence the clear paraffine is run off.

Having thus described my invention, what I claim as new, and desire to secure by Letters Patent, is—

The herein-described process of treating paraffine and fatty oil, consisting, essentially, in reheating the clarified portion of the same, agitating it mixed with sulphuric acid for removing the colored matter, adding fuller's-earth, and mixing it with naphtha, as shown and described.

The above specification of my invention signed by me this 8th day of August, 1870.

FREDERICK LAMBE.

Witnesses:
 STEPHEN BLACKBURN,
 HENRY MATHEWSON.